(12) United States Patent
Ishii

(10) Patent No.: US 8,739,713 B2
(45) Date of Patent: Jun. 3, 2014

(54) SEWING METHOD FOR A COVER MATERIAL

(71) Applicant: Toyota Boshoku Kabushiki Kaisha, Aichi-ken (JP)

(72) Inventor: Atsushi Ishii, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/894,666

(22) Filed: May 15, 2013

(65) Prior Publication Data
US 2013/0305974 A1 Nov. 21, 2013

(30) Foreign Application Priority Data
May 16, 2012 (JP) .................. 2012-112488

(51) Int. Cl.
*D05B 11/00* (2006.01)
(52) U.S. Cl.
USPC ................................. 112/475.08
(58) Field of Classification Search
USPC ............ 112/475.08, 475.01, 475.02, 470.03, 112/470.13, 10; 297/217.3, 180.12, 180.1; 219/605, 635, 636, 202
See application file for complete search history.

(56) References Cited

U.S. PATENT DOCUMENTS

| | | | | |
|---|---|---|---|---|
| 4,927,209 | A * | 5/1990 | Maruyama | 297/180.12 |
| 5,111,023 | A * | 5/1992 | Horibe et al. | 219/121.85 |
| 6,663,175 | B2 * | 12/2003 | Mosquera et al. | 297/180.12 |
| 7,205,505 | B2 * | 4/2007 | Diemer et al. | 219/217 |
| 7,977,608 | B2 * | 7/2011 | Diemer et al. | 219/217 |
| 8,022,307 | B2 * | 9/2011 | Chu et al. | 174/254 |

FOREIGN PATENT DOCUMENTS

JP 2011-243307 12/2011

* cited by examiner

*Primary Examiner* — Tejash Patel
(74) *Attorney, Agent, or Firm* — Greenblum & Bernstein, P.L.C.

(57) ABSTRACT

A sewing machine is provided with a sensor member, and a feed rate of cover pieces is changed after detecting a conductive thread that is arranged in front, in a direction of travel, of a sewing needle. A position through which the sewing needle will pass is changed to a position other than a position where the conductive thread is arranged, which is different from an initially set position.

4 Claims, 5 Drawing Sheets

SEWING METHOD FOR A COVER MATERIAL

INCORPORATION BY REFERENCE

The disclosure of Japanese Patent Application No. 2012-112488 filed on May 16, 2012 including the specification, drawings and abstract is incorporated herein by reference in its entirety.

BACKGROUND OF THE INVENTION

1. Field of the Invention

The invention relates to a sewing method for sewing (with a sewing machine) a cover material that includes conductive thread.

2. Description of Related Art

One such known cover material is a cover material that can be used as a cover material of a vehicle seat (see Japanese Patent Application Publication No. 2011-243307 (JP 2011-243307 A)). This cover material is a sheet-shaped member of woven fabric or knit fabric or the like that has a plurality of conductive threads woven in (or knitted in) as constituent threads. The plurality of conductive threads extend linearly from one end the other end of the cover material, while being arranged parallel at appropriate intervals. By energizing the plurality of conductive threads, the cover material is able to function as a heater. Also, the cover material (i.e., the conductive thread) is also able to function as an electrode of a capacitance sensor. Here, this kind of cover material is typically made by sewing together a plurality of cover pieces in a bag shape. For example, after preparing the cover pieces by cutting raw fabric, i.e., the woven fabric or the knit fabric, into predetermined shapes, edge portions of adjacent cover pieces are overlapped. Then the overlapping portions are sewn together (i.e., a stitch line formed by a plurality of perforations is formed) by passing a sewing needle through the cover pieces at a predetermined pitch, while moving the cover pieces at a predetermined feed rate with respect to a sewing machine.

In this related art (JP 2011-243307 A), the plurality of conductive threads are arranged linearly from one end to the other end of the cover material (i.e., are arranged at end portions of the cover pieces). Therefore, when the edge portions of the cover pieces are sewn together with the sewing machine, there are cases in which the stitch line formed by a plurality of perforations intersects with the conductive threads or the like, and the conductive threads are broken by the sewing needle. Of course, the sewing needle can be made to pass through positions that differ from the positions where the conductive threads are arranged, by setting the size of the perforations and the like beforehand while taking the interval between the conductive threads into account. However, it is difficult to reliably avoid the conductive threads being broken by the sewing needle because the interval between conductive threads changes (i.e., the conductive threads may be arranged in unexpected positions) due to expansion and contraction of the cover material or the like.

SUMMARY OF THE INVENTION

The invention makes a cover material while avoiding, to the greatest extent possible, breakage of a conductive thread. One aspect of the invention relates to a sewing method for a cover material, which is a method of forming a cover material that covers a vehicle structure member such as a vehicle seat, by sewing together a plurality of cover pieces with a sewing machine. In this aspect, a plurality of conductive threads that extend linearly in one direction are arranged parallel to each other in at least one cover piece, from among the plurality of cover pieces. A stitch line formed of a plurality of perforations is formed crossing the conductive threads by passing a sewing needle of the sewing machine through the cover pieces at a predetermined pitch, while moving the cover pieces at a predetermined feed rate with respect to the sewing machine. With this kind of structure, it is desirable that the cover material be able to be made while avoiding, to the greatest extent possible, breakage of the conductive threads.

Therefore, in this aspect, the sewing machine is provided with a sensor member, and a position through which the sewing needle will pass is changed to a position other than a position where the conductive threads are arranged, which is different from an initially set position, by changing the feed rate of the cover pieces, after detecting one of the conductive threads that is arranged in front, in a direction of travel, of the sewing needle. Also, in this aspect, the feed rate of the cover pieces may be changed such that a size of the plurality of perforations changes. Also in the aspect described above, the feed rate of the cover pieces may be changed such that the sewing needle is arranged at top dead center at a position where the one conductive thread detected by the sensor member is arranged. Further, in the aspect described above, the position through which the sewing needle will pass may be changed to a position other than the position where the one conductive thread is arranged (thus enabling breakage of the conductive thread to be better avoided), by changing the feed rate of the cover pieces after it is detected in advance that the one conductive thread is in a planned position through which the sewing needle will pass.

According to this aspect, a cover material is able to be made while avoiding, to the greatest extent possible, breakage of a conductive thread.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
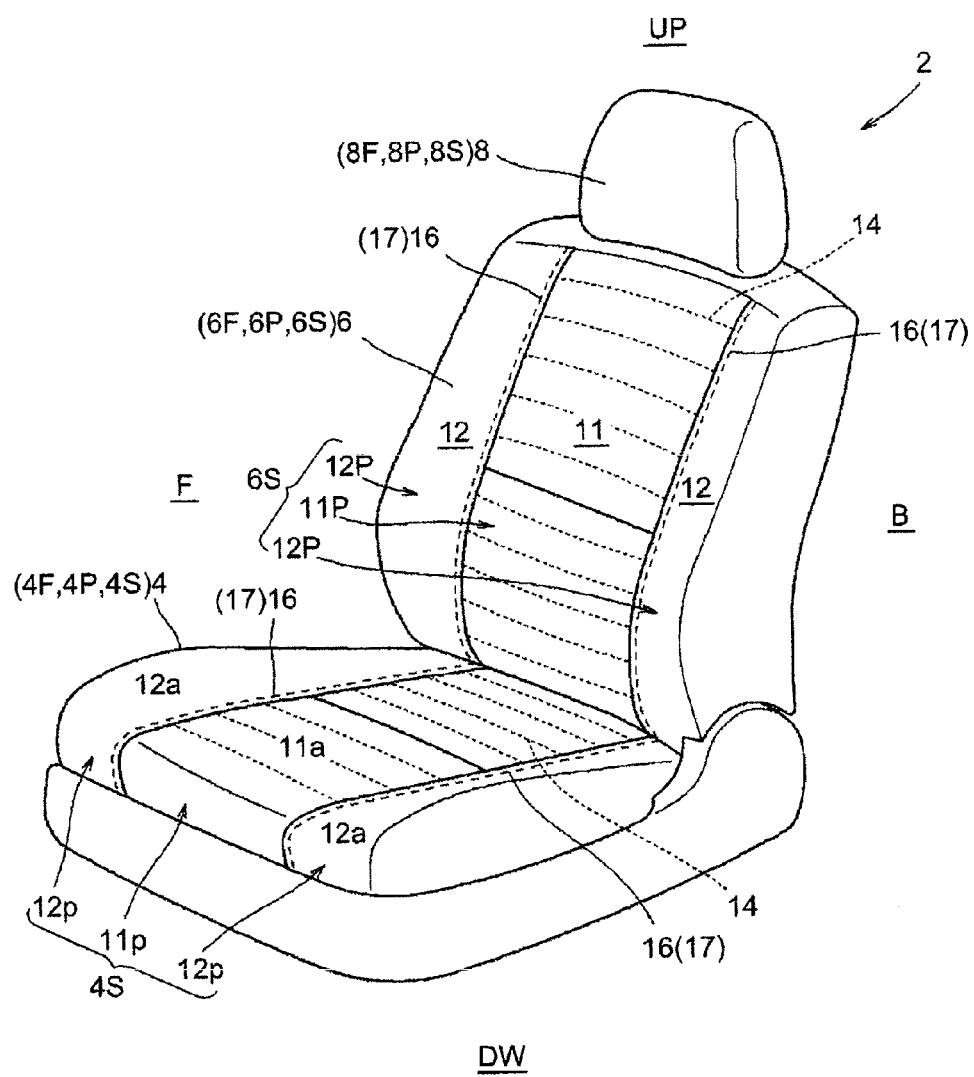
FIG. 1 is a perspective view of a vehicle seat.

Hereinafter, example embodiments of the invention will be described with reference to FIGS. 1 to 10. In the drawings, reference character F denotes a forward direction with respect to a vehicle seat, reference character B denotes a rearward (backward) direction with respect to the vehicle seat, reference character UP denotes an upward direction with respect to the vehicle seat, and reference character DW denotes a downward direction with respect to the vehicle seat. A vehicle seat 2 in FIG. 1 has a seat cushion 4, a seat back 6, and a headrest 8. These seat structure members each have a frame member (4F, 6F, 8F) that forms a seat frame, a cushion (4P, 6P, 8P) that forms the outer shape of the seat, and a cover material (4S, 6S, 8S) that covers the cushion. Here, the frame members 4F and 6F, not shown, are arch-shaped frame members that are formed following the outer shape of the seat. Also, the cushions 4P and 6P, not shown, are members that elastically support an occupant, and are formed with polyurethane foam (density: 10 kg/m$^3$ to 60 kg/m$^3$), for example.

The seat back 6 is a member that is connected to the seat cushion 4 in a manner that enables it to be reclined and raised with respect to the seat cushion 4. The seat back 6 includes the structures described above (6S, 6P, 6F), a top portion 11, and a pair of side portions 12 (see FIG. 1). The top portion 11 is a flat portion in the center of the seat back 6, and faces the trunk (e.g., the back and waist) of an occupant. Also, the side portions 12 are portions that are arranged to the sides of the top portion 11 and protrude toward the seating side of the seat back 6.

In this example embodiment, the cushion 6P is covered by the cover material 6S (to be described in detail later) after being arranged on the frame member 6F. A plurality of conductive threads 14 (hereinafter also referred to in the singular for simplicity) are arranged parallel to a seat width direction, as well as parallel to each other, in the center of the cover material 6S. As a result, the cover material 6S is able to function as a heater or an electrode of a capacitance sensor. The cover material 6S is made by sewing a plurality of cover pieces (11P, 12P, etc.) together in a bag shape with a sewing machine 20 (the method by which the cover material 6S is made will be described later). Stitch lines 17, each formed by a plurality of perforations 16, are formed running up and down the seat, in the cover material 6S. With this kind of structure, when edge portions of the cover pieces are sewn together with the sewing machine 20, there is a possibility that the stitch lines 17 formed by the plurality of perforations 16 may intersect with the conductive threads 14 or the like, and the conductive threads 14 may be broken by a sewing needle 22. Therefore, in this example embodiment, the cover material 6S is made while avoiding, to the greatest extent possible, breakage of the conductive threads 14 by the structures which will be described later. Hereinafter, each of the structures will be described in detail.

The cover material 6S is a sheet-shaped member that is made from fabric (woven, knit, or non-woven fabric) or leather (natural leather or synthetic leather), and includes the conductive threads 14 and non-conductive threads (see FIGS. 1 to 4). The conductive threads 14 (i.e., material capable of conducting electricity) may be made of carbon fiber filament, metal wire such as stainless steel, or plated wire, for example. The diameter of the conductive threads 14 is not particularly limited, but is preferably such that the conductive threads 14 are able to be woven in or knitted in as the constituent threads of the cover material 6S. Also, the non-conductive threads, not denoted by reference characters, are wires that are made of a fiber (such as filament, spun yarn, drawn yarn, and elastic textured yarn) that is less conductive than the conductive threads 14. Examples of this kind of fiber are natural fiber of a plant system or an animal system, synthetic fiber made of thermoplastic resin or thermosetting resin, or a combined fiber that is a combination of these.

In this example embodiment, when weaving or knitting the cover material 6S, the plurality of conductive threads 14 are woven in (or knitted in) as some of the constituent threads of the cover material 6S. Also, the plurality of conductive threads 14 may also be attached to one surface of the cover material 6S (that is either non-woven or leather). Here, the spacing dimension between adjacent conductive threads 14 may be changed as appropriate according to the seat structure. For example, when the cover material 6S is to have a heater function, the spacing dimension between the conductive threads 14 may be set to be within 60 mm. Also, when the cover material 6S is to have a sensor (electrode) function as well, setting the spacing dimension between conductive threads 14 to be within 60 mm enables an excellent sensor function (capacitance) to be provided. Also, the plurality of conductive threads 14 are arranged parallel while extending linearly from one end to the other end (i.e., in one direction) of the cover material 6S. With a typical seat structure, the appearance of the seat is able to be nicely maintained by arranging the conductive threads 14 on a back surface (i.e., a surface facing the cushion) of the cover material 6S (i.e., by making them not easily visible from the front side (i.e., the surface)).

Figure 2:
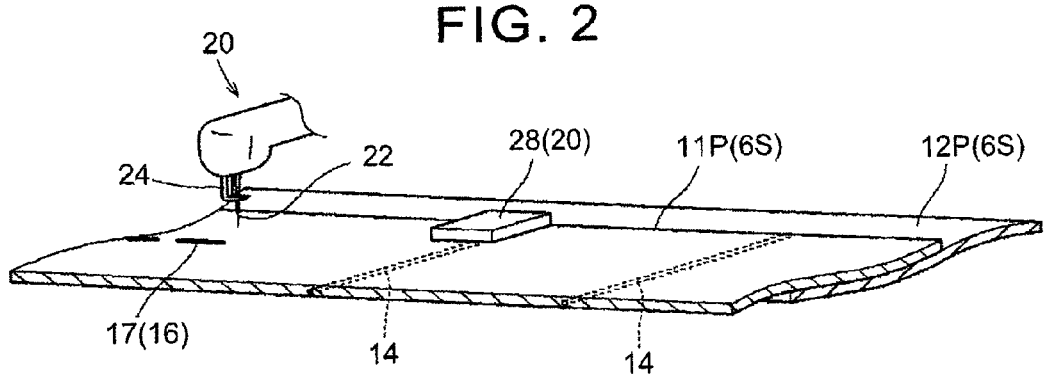
FIG. 2 is a perspective view of a portion of a sewing machine and a portion of a cover material.

Also, the cover material 6S of this example embodiment may be formed by sewing a plurality of cover pieces (i.e., a first piece 11P, second pieces 12P, etc.) together in a bag shape (see FIGS. 1 and 2). The first piece 11P is a cover piece that is able to cover the top portion 11, and includes the plurality of conductive threads 14. The plurality of conductive threads 14 are arranged in parallel while extending linearly from one end to the other end (in the seat width direction) of the first piece 11P. The second piece 12P is a cover piece that is able to cover the side portion 12. Also, as will be described later, the cover material 6S (i.e., the bag shape) is made by overlapping an end portion of the first piece 11P with an end portion of the second piece 12P, and then sewing these overlapping end portions together, with the sewing machine 20.

Here, the seat cushion 4 includes the structures described above (4S, 4P, 4F), a top portion 11a, and a pair of side portions 12a (see FIG. 1). The top portion 11a is a flat portion in the center of the seat cushion 4, and faces the buttocks and legs of the occupant. Also, the side portions 12a are portions that are arranged to the sides of the top portion 11a and protrude toward the seating side. With the seat cushion 4 as well, the cover material 4S is formed by sewing a plurality of cover pieces (i.e., a first piece 11p, second pieces 12p, etc.) together in a bag shape. The structure (i.e., the conductive threads 14, the perforations 16, etc.) of the seat cushion 4 according to this example embodiment is the substantially same as the structure of the seat back 6. Therefore, portions of the seat cushion 4 that correspond to portions of the seat back 6 will be denoted by corresponding reference characters, and detailed descriptions of those portions will be omitted.

The sewing machine 20 is a generally sideways U-shaped (when viewed from the front) apparatus, and includes an internal mechanism, not shown, a sewing needle 22, a retaining portion 24, a feed rate adjusting mechanism 26, a hook member, not shown, and a sensor member 28 (to be described later) (see FIGS. 2 to 5). Here, the internal mechanism, not shown, includes a control portion, a main shaft that is rotated by a motor, and a rotary encoder that detects rotation of the main shaft. Also, the retaining portion 24 and the sewing needle 22 (to be described later) are provided on an upper portion of the sewing machine 20, and are arranged so as to be able to face the front side (i.e., the surface) of the cover material 6S. The retaining portion 24 is a flat plate member that is generally L-shaped (when viewed from the side), and has a groove 25 into which the sewing needle 22 can be inserted in the center (see FIGS. 3 and 4). Also, the feed rate adjusting mechanism 26 (to be described later) and the hook member are provided on a lower portion of the sewing machine 20, and are arranged so as to be able to face the back side of the cover material 6S (see FIG. 5). Also, the hook member is a cylindrical member for supplying bobbin thread, and is arranged facing the sewing needle 22 on the back surface of the cover material 6S.

Figure 3:
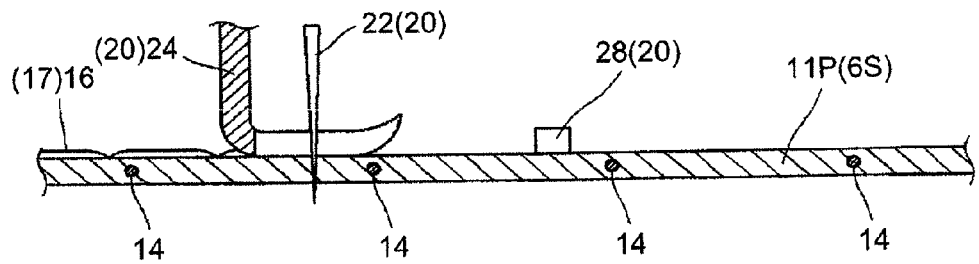
FIG. 3 is a sectional view schematically showing a portion of the sewing machine and a portion of the cover material.
Figure 4:
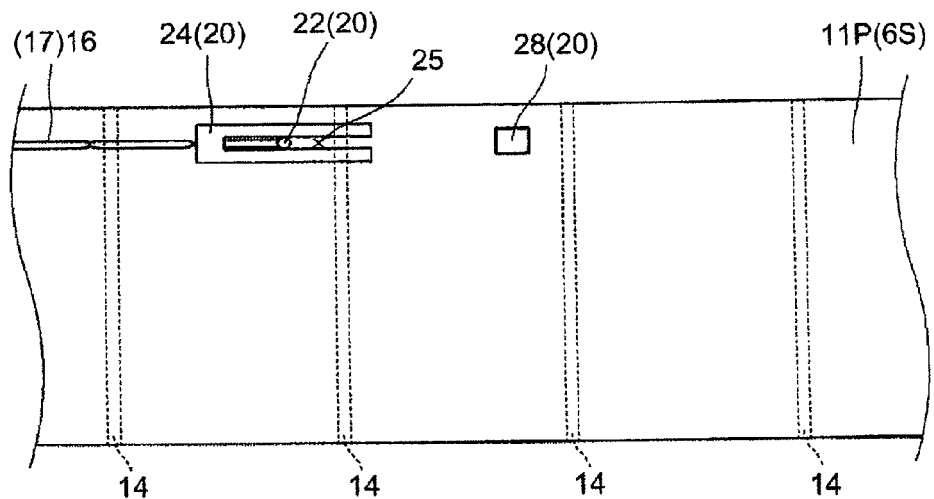
FIG. 4 is a plan view of the portion of the sewing machine and the portion of the cover material.

The sewing needle 22 is a needle that supplies needle thread, and is connected to the main shaft via a crank mechanism (see FIGS. 2 to 4). The sewing needle 22 in this example embodiment moves up and down (toward and away from the cover material 6S) as the main shaft rotates, being displaced between top dead center and bottom dead center. The sewing needle 22 at top dead center is arranged farthest away from the cover material 6S. Also, the sewing needle 22 at bottom dead center is arranged such that the needle thread crosses the bobbin thread, while the sewing needle 22 protrudes from the center (inside the groove 25) of the retaining portion 24 and passes through the cover material 6S. Also, in this example embodiment, the position of the sewing needle 22 is able to be detected by the rotary encoder (for example, the position of the sewing needle 22 is able to be detected by the position of a crankshaft), and the position information of the sewing needle 22 can be transmitted to the control portion.

The feed rate adjusting mechanism 26 is a mechanism that moves (feeds) the cover material 6S relative to the sewing machine 20. The feed rate adjusting mechanism 26 in this example embodiment includes an eccentric cam 2g on an upper shaft A1, a connecting rod 10g, adjusting mechanisms (3g, 4g, 6g, 8g), and feeding dog mechanisms (12g, 14g, 16g, 18g, 20g). The upper shaft A1 is a shaft-like member that is able to rotate in synchronization with the main shaft. An eccentric cam 2g is a cylindrical portion that protrudes in a radial direction (i.e., partially protrudes in the radial direction) of the upper shaft A1. Also, the connecting rod 10g is a flat plate member having a generally rectangular shape. One end of the connecting rod 10g is forked (i.e., two-pronged) and is engaged with the eccentric cam 2g in a manner that enables relative movement between the connecting rod 10g and the eccentric cam 2g. The other end of the connecting rod 10g is rotatably connected to the feed dog mechanism (to be described later). Also, an adjusting mechanism (to be described later) is connected to a portion in the middle of (toward one end of) the connecting rod 10g. Also, the feed dog mechanism includes a rotating arm 12g, a feed shaft 14g, a feed bar arm 16g, a feed bar 18g, and a feed dog 20g. The rotating arm 12g (that is lever-like) is a member that converts the up and down motion of the connecting rod 10g into rotary motion of the feed shaft 14g (shafting). Also, the feed bar arm 16g (that is lever-like) is a member that converts the rotary motion of the feed shaft 14g into sliding motion (i.e., sliding movement in the feed direction of the cover material 6S) of the feed bar 18g (a flat plate member that has a generally rectangular shape). The feed dog 20g is arranged on a tip end of the feed bar 18g. The feed dog 20g is a serrated portion that is able to abut against the cover material 6S. In this example embodiment, the connecting rod 10g is moved up and down by the rotation of the upper shaft A1 (i.e., the eccentric cam 2g). At this time, the connecting rod 10g moves downward by the pressure of a protruding portion of the eccentric cam 2g, and moves upward by abutting against a peripheral surface of the eccentric cam 2g other than the protruding portion. The up and down motion of the connecting rod 10g is able to be converted into sliding movement of the feed bar 18g (i.e., sliding movement in the feed direction of the cover material 6S) via a plurality of members (i.e., the rotating arm 12g, the feed shaft 14g, and the feed bar arm 16g).

The adjusting mechanism is a mechanism that adjusts the amount of up and down movement of the connecting rod 10g (i.e., the amount of sliding movement of the feed bar 18g), and includes a forked link 3g, an adjusting base 4g, a roller shaft 6g, and a lever shaft 8g. The adjusting base 4g is a flat plate member that is generally rectangular shaped, and has a recessed portion that is open to the lower side. Also, one side (the side that has the forked shape) of the forked link 3g is connected to an upper portion of the adjusting base 4g, and the other side of the forked link 3g is connected to a middle portion (i.e., a portion toward one end of) the connecting rod 10g. The adjusting base 4g moves up and down in synchronization with the up and down movement of the connecting rod 10g, via the forked link 3g. Also, the lever shaft 8g (that is shaft-like) is able to be rotatably operated from the outside. One side of the lever shaft 8g is crank-shaped, with the roller shaft 6g (that is shaft-like) provided on the tip end. In this example embodiment, the roller shaft 6g is arranged so as to be able to restrict the up and down movement of the adjusting base 4g by fitting into a lower portion (i.e., the recessed portion) of the adjusting base 4g. At this time, the up and down movement range of the connecting rod 10g is reduced by moving the roller shaft 6g upward and reducing the up and down movement range of the adjusting base 4g. Reducing the up and down movement range of the connecting rod 10g in this way enables the sliding movement range of the feed bar 18g to be reduced via a plurality of members (i.e., the rotating arm 12g, the feed shaft 14g, and the feed bar arm 16g). Also, the up and down movement range of the connecting rod 10g is increased by moving the roller shaft 6g downward to increase the up and down movement range of the adjusting base 4g. Increasing the up and down movement range of the connecting rod 10g in this way enables the sliding movement range of the feed bar 18g to be increased via a plurality of members (i.e., the rotating arm 12g, the feed shaft 14g, and the feed bar arm 16g).

Figure 5:
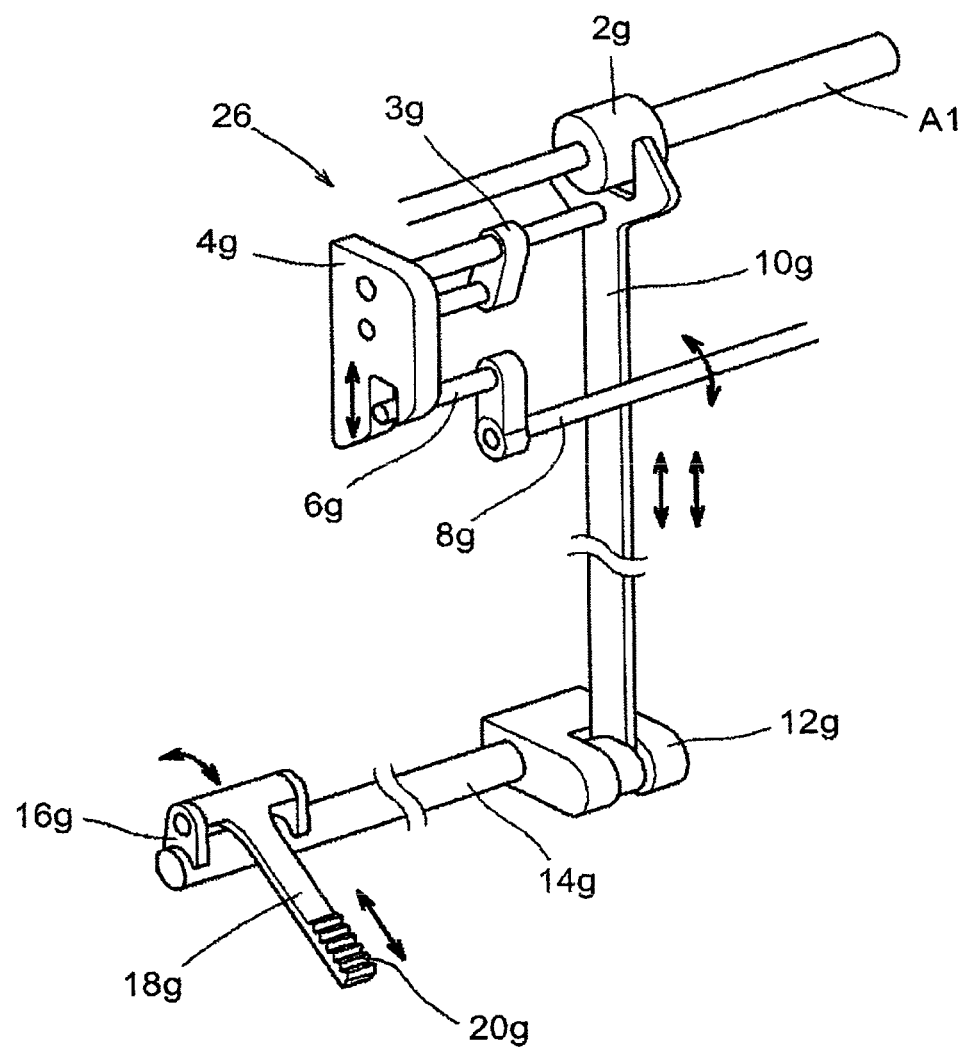
FIG. 5 is a schematic of a portion of the sewing machine.
Figure 6A:
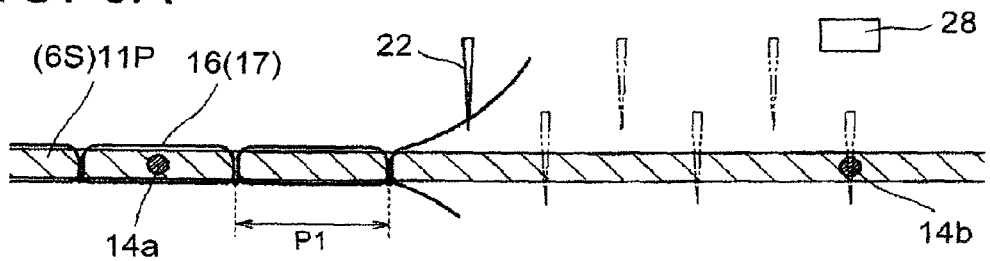
FIG. 6A is a sectional view of the cover material during sewing, and a portion of the sewing machine before a feed rate is changed.

Also, in this example embodiment, after holding the cover material 6S with the feed dog 20g and the retaining portion 24, the sewing needle 22 (at bottom dead center) is passed through the cover material 6S, and the needle thread crosses the bobbin thread (see FIGS. 5 and 6A). Next, the cover material 6S is able to be fed with respect to the sewing machine 20 by moving the feed dog 20g in the feed direction, while moving the sewing needle 22 upward. At this time, the feed rate of the cover material 6S is able to be increased or decreased by the feed rate adjusting mechanism 26 (i.e., by operating the lever shaft 8g). Adjusting the feed rate of the cover material 6S in this way enables the stitching pitch (i.e., the length dimension of one stitch) of the perforations 16 to be adjusted. At this time, the stitching pitch is preferably smaller than the gap spacing between adjacent conductive threads 14. For example, setting the stitching pitch (i.e., the length dimension of one stitch) of the perforations 16 to 4.5±1.0 mm enables the stitch strength of the stitch lines 17 to be suitably maintained. The sewing method (the stitch format) is not particularly limited. Some possible examples are a lockstitch, a single chain stitch, a double chain stitch, a hem stitch, and an interlock stitch.

The sensor member 28 has a mechanism capable of detecting the conductive thread 14. Some examples are a magnetic mechanism, an X-ray emission mechanism, and a capacitance mechanism (see FIGS. 2 to 4, and FIG. 6A). In this example embodiment, the sewing machine 20 is provided with the sensor member 28, and the conductive thread 14 that is arranged in front, in the direction of travel, of the sewing needle 22 is able to be detected. The position in which the sensor member 28 is arranged is not particularly limited, but the sensor member 28 is typically arranged facing at least one of the front side and the back side of the cover material 6S.

Figure 6B:
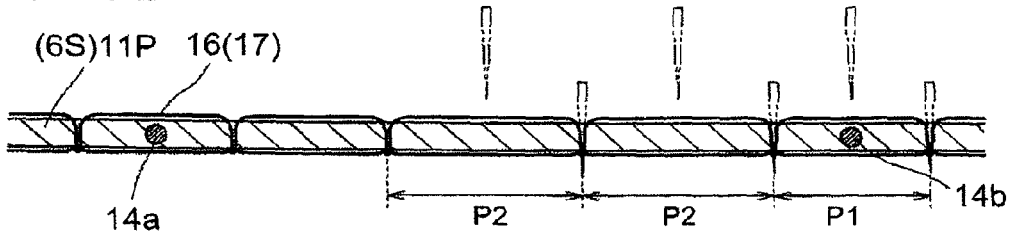
FIG. 6B is a sectional view of the cover material during sewing, and a portion of the sewing machine after the feed rate is changed.

Referring to FIGS. 2, 6A, and 6B, the bag-shaped cover material 6S is made by sewing together the plurality of the cover pieces (i.e., the first piece 11P and the second pieces 12P etc.) with the sewing machine 20. In this example embodiment, the end portion of the first piece 11P and the end portion of the second piece 12P are overlapped with each other, and this overlapping portion is then sewn with the sewing machine 20 (so as to form the stitch line 17). At this time, the cover pieces (i.e., the overlapping portion) is moved relative to the sewing machine 20, and feed in a direction that intersects with (i.e., crosses) the conductive threads 14. The stitch line 17 formed of the plurality of perforations 16 is then formed by passing the sewing needle 22 through the cover material 6S at a predetermined pitch, and crossing the bobbin thread of the hook member with the needle thread of the sewing needle 22.

With the structure described above, the stitch line 17 is formed crossing the conductive threads 14, so attention must be paid such that the conductive threads 14 are not broken by the sewing needle 22. For example, with the first piece 11P in this example embodiment, the spacing dimension between adjacent conductive threads 14 (i.e., between a first conductive thread 14a and a second conductive thread 14b) is set to 20 mm. Also, a first stitching pitch P1 (an initial setting) of the perforations 16 is set to 4 mm, which is ⅕ of the spacing between conductive threads. Also, the first conductive thread 14a is able to avoid being broken by the sewing needle 22, by having the sewing needle 22 be at top dead center (i.e., by setting an initially set position of the sewing needle 22 to top dead center) in the position where the first conductive thread 14a is arranged. Then by having the sewing needle 22 proceed five stitches (i.e., proceed 20 mm), the sewing needle 22 will again be at top dead center when the sewing needle 22 reaches the position where the second conductive thread 14b is arranged.

However, with this structure, the second conductive thread 14b may be in an unexpected position due to a change in the spacing between conductive threads caused by expansion and contraction or the like of the first piece 11P. Therefore, in this example embodiment, the sewing machine 20 is provided with the sensor member 28, and the conductive thread (i.e., the second conductive thread 14b) that is arranged in front, in the direction of travel, of the sewing needle 22 is detected. The position through which the sewing needle 22 passes through the cover material 6S is then able to be changed to a position that differs from the initially set position (i.e., to a position other than the position where the conductive thread is arranged), by changing the feed rate of the cover pieces (11P and 12P).

Figure 7:
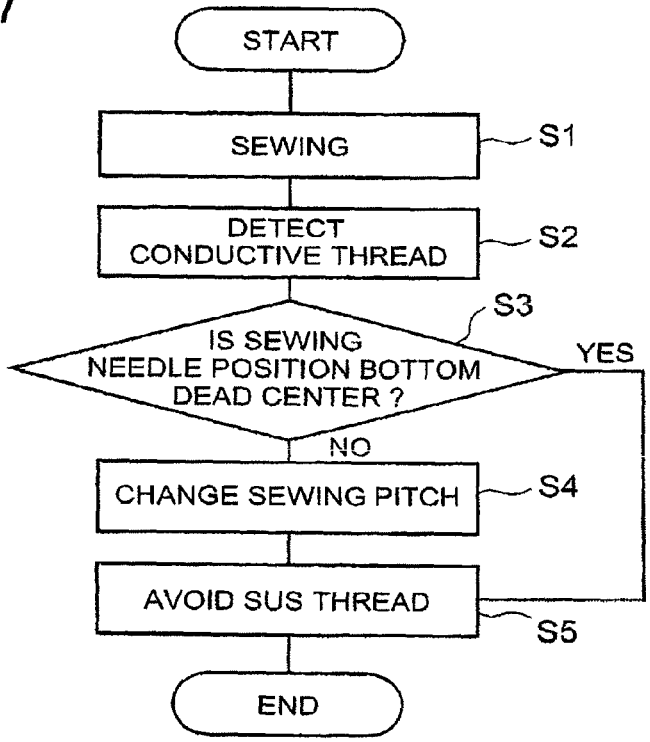
FIG. 7 is a flowchart illustrating the operation of the sewing machine.
Figure 8A:
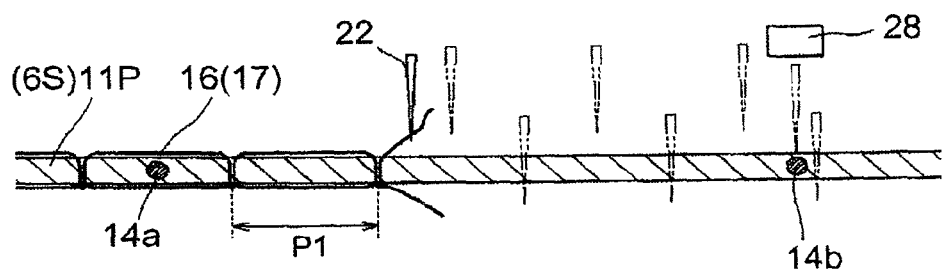
FIG. 8A is a sectional view of the cover material during sewing and a portion of the sewing machine before the feed rate is changed according to a first modified example.
Figure 8B:
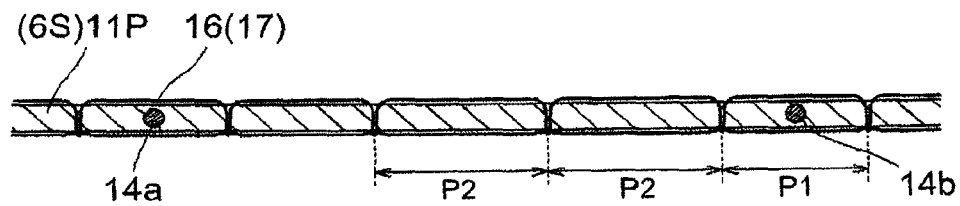
FIG. 8B is a sectional view of the cover material after the feed rate is changed according to the first modified example.

The sewing operation of the cover pieces starts in step S1 in FIG. 7. Then the sensor member 28 detects whether there is a conductive thread (second conductive thread 14b) in a position 2.5 stitches (10 mm) in front of the sewing needle 22 (see FIG. 6A). Then in step S2, after the second conductive thread 14b is detected by the sensor member 28, the position of the actual sewing needle 22 (i.e., of the sewing needle indicated by the solid line in FIG. 6A) is detected by the rotary encoder. If the actual sewing needle 22 is at top dead center at this time, the position of the sewing needle 22 at the position where the second conductive thread 14b is arranged (i.e., at a position 2.5 stitches ahead) will be at bottom dead center (i.e., a state in which the sewing needle 22 has passed through the cover material 6S). If the actual sewing needle 22 is not at bottom dead center in this way, then it is determined that the sewing needle 22 will break the conductive thread 14 (i.e., a determination of No is made in step S3). Therefore in step S4, the feed rate of the cover pieces is increased via the feed rate adjusting mechanism 26. At this time, in this example embodiment, a second stitching pitch P2 of the perforations 16 for two stitches is set to 5.0 mm, and then the feed rate is returned to the initially set feed rate (i.e., the first stitching pitch P1) (see FIG. 6B). As a result, the sewing needle 22 will be at top dead center at the position where the second conductive thread 14b is arranged, so the cover pieces can continue to be sewn (step S5 in FIG. 7) while crossing over the second conductive thread 14b (while avoiding breaking the second conductive thread 14b).

In contrast, the actual sewing needle 22 is made to be at bottom dead center 2.5 stitches (10 mm) before the conductive thread 14 (not shown in FIG. 6A). At this time, the position of the sewing needle 22 at the position where the second conductive thread 14b is arranged (i.e., at a position 2.5 stitches ahead) will be at top dead center (i.e., the farthest away from the cover material 6S). If the actual sewing needle 22 is at bottom dead center in this way, it is determined that the sewing needle 22 will not break the conductive thread 14 (i.e., a determination of Yes will be made in step S3 in FIG. 7). Therefore, breakage of the conductive thread 14 is able to be avoided by continuing to sew without changing the feed rate of the cover pieces (step S5 in FIG. 7).

As described above, in this example embodiment, the sensor member 28 detects beforehand that the conductive thread 14 is in a planned position through which the sewing needle 22 will pass. By changing the feed rate of the cover pieces, the position through which the sewing needle 22 will pass can be changed to a position different from the position where the conductive thread 14 is arranged (i.e., breakage of the conductive thread 14 can be avoided as much as possible). Also, in this example embodiment, the size of the plurality of perforations 16 is able to be changed. As a result, the stitch strength of the cover material 6S, and the appearance of the stitch line 17, are able to be better maintained compared with when only a single perforation 16 is made significantly larger. Thus, according to this example embodiment, the cover material 6S is able to be made while avoiding breakage of the conductive thread 14 to the greatest extent possible.

The control method of the sewing machine 20 may take on any of a variety of structures aside from the structure described above. For example, in a first modified example as well, the position of the sewing needle 22 2.5 stitches (10 mm) before the second conductive thread 14b is detected (see FIG. 8A). If the actual sewing needle 22 is between bottom dead center and top dead center (i.e., is moving) at this time, then the sewing needle 22 will be between top dead center and bottom dead center (i.e., be moving) at the position where the second conductive thread 14b is arranged (i.e., the position 2.5 stitches ahead) as well. When the sewing needle 22 will not be at top dead center at the position where the second conductive thread 14b is arranged in this way, the second conductive thread 14b would be offset from the center of the perforations 16 (e.g., in this modified example, the second conductive thread 14b would be offset 1.0 mm from the center). Therefore, in this modified example, the feed rate of the cover material 6S is increased and the second stitching pitch P2 of the perforations 16 for two stitches is set to 4.5 mm, after which the feed rate is returned to the initially set feed rate (i.e., first stitching pitch P1) (see FIG. 8B). In this way, the second conductive thread 14b is able to be arranged in the center of the perforations 16 (i.e., more consistently arranged) by arranging the sewing needle 22 at top dead center at the position where the second conductive thread 14b is arranged.

Figure 9:
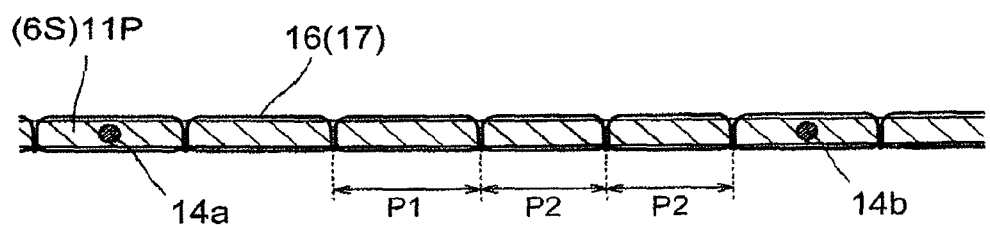
FIG. 9 is a sectional view of the cover material according to a second modified example.

Also, in a second modified example as well, the position of the sewing needle 22 2.5 stitches (10 mm) before the second conductive thread 14b is detected (see FIGS. 6A and 9). When the actual sewing needle 22 is at top dead center at this time, the sewing needle 22 at the position where the second conductive thread 14b is arranged (i.e., a position 2.5 stitches ahead) will be at bottom dead center (i.e., it is determined that the sewing needle 22 will break the conductive thread 14). Therefore, in this modified example, the feed rate of the cover material 6S is reduced and the second stitching pitch P2 of the perforations 16 for two stitches is set to 3.5 mm, after which the feed rate is returned to the initially set feed rate (i.e., first stitching pitch P1) (see FIG. 9). In this way, the cover pieces can continue to be sewn together while crossing over the second conductive thread 14b (i.e., while avoiding breaking the second conductive thread 14b), by arranging the sewing needle 22 at top dead center at the position where the second conductive thread 14b is arranged.

Figure 10:
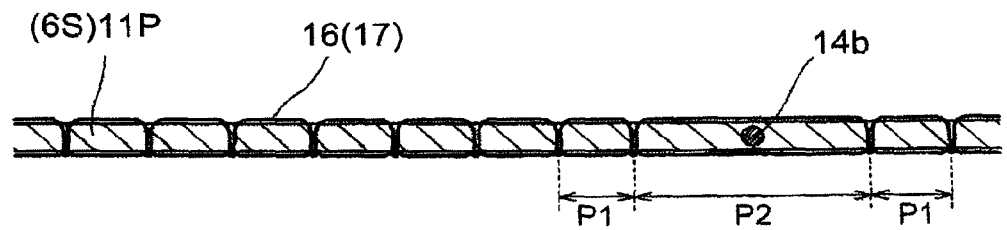
FIG. 10 is a sectional view of the cover material according to the third modified example.

Also, in a third modified example as well, the position of the sewing needle 22 ahead of the second conductive thread 14b is detected (see FIGS. 6A and 10). In this modified example, the feed rate of the cover material 6S is increased only when crossing over the second conductive thread 14b, so the perforation 16 for one stitch is made larger. For example, an area where the first stitching pitch P1 is 2.0 mm is changed to the second stitching pitch P2 and made 6.0 mm (see FIG. 10). In this way, the cover pieces can continue to be sewn together while crossing over the second conductive thread 14b (i.e., while avoiding breaking the second conductive thread 14b), by arranging the sewing needle 22 at top dead center at the position where the second conductive thread 14b is arranged.

The method by which the cover material is sewn together in this example embodiment is not limited to that described in the example embodiment described above. That is, various other example embodiments are also possible. In this example embodiment, the structure of the conductive threads 14 (e.g., the number provided, the positions in which they are arranged, the spacing dimension, and the like), the structure of the perforations 16 (e.g., the stitching pitch and the number of perforations that are formed and the like), and the structure of the stitch lines 17 (e.g., the number of stitch lines that are formed and the positions in which they are arranged and the like) are described having specific numeric values and the like, but the structures are not limited to these. For example, the conductive threads 14 are not limited to being in arranged in the seat width direction, but may be provided extending in any of a variety of directions such as a seat vertical direction or a seat front-rear direction. Also, the stitch lines 17 may also cross the conductive threads 14 orthogonally, or may cross the conductive threads 14 at an angle.

Also, in this example embodiment, the structure of the sewing machine 20 is illustrated, but the structure of the sewing machine is not limited to this. For example, the sensor member may detect the conductive thread much farther ahead than 2.5 stitches in front of the sewing needle, or the sensor member may detect the conductive thread just ahead of 2.5 stitches in front of the sewing needle. Also, a plurality of stitches such as a double stitch may also be formed by providing a plurality of sewing needles and hook members or the like. Further, in this example embodiment, an example in which the conductive thread 14 is arranged in the first piece 11P (11p) is described, but the location where the conductive thread 14 is arranged is not limited to this. The conductive thread may be arranged in any of a variety of cover pieces (a plurality of cover pieces or a single cover piece) such as the second pieces, according to the seat structure. Also, in this example embodiment, the seat cushion and seat back are given as an example, but the structure of the example embodiment may be applied to any of a variety of vehicle structure members and seat structure members such as a headrest.

What is claimed is:

1. A sewing method for a cover material, comprising:
    sewing a plurality of cover pieces together with a sewing machine to form a cover material that covers a vehicle structure member;
    arranging a plurality of conductive threads that extend linearly parallel to each other in at least one of the plurality of cover pieces;
    forming a stitch line formed of a plurality of perforations that crosses the plurality of conductive threads, by passing a sewing needle of the sewing machine through the cover material at a predetermined pitch, while moving the cover material at a predetermined feed rate with respect to the sewing machine; and
    providing the sewing machine with a sensor member, and changing a position through which the sewing needle will pass to a position other than a position where the plurality of conductive threads are arranged, which is different from an initially set position, by changing the feed rate of the cover material, after detecting one of the plurality of conductive threads that is arranged in front, in a direction of travel, of the sewing needle.

2. The sewing method according to claim 1, wherein the feed rate of the cover material is changed such that a size of the plurality of perforations changes.

3. The sewing method according to claim 1, wherein the feed rate of the cover material is changed such that the sewing needle is arranged at top dead center at a position where the one of the plurality of conductive threads detected by the sensor member is arranged.

4. The sewing method according to claim 1, wherein the feed rate of the cover material is changed after it is detected that the one of the plurality of conductive threads is in a planned position through which the sewing needle will pass.

* * * * *